United States Patent
Nair et al.

(10) Patent No.: US 10,165,546 B2
(45) Date of Patent: Dec. 25, 2018

(54) PROTECTION OF PRIVACY IN PAGING OF USER EQUIPMENT

(71) Applicants: Alcatel-Lucent USA Inc., Murray Hill, NJ (US); Nokia Technologies OY, Espoo (FI)

(72) Inventors: Suresh P. Nair, Whippany, NJ (US); Anja Jerichow, Grafing (DE)

(73) Assignees: NOKIA TECHNOLOGIES OY, Espoo (FI); NOKIA OF AMERICA CORPORATION, Murray Hill, NJ (US)

( * ) Notice: Subject to any disclaimer, the term of this patent is extended or adjusted under 35 U.S.C. 154(b) by 0 days.

(21) Appl. No.: 15/462,207

(22) Filed: Mar. 17, 2017

(65) Prior Publication Data
US 2018/0270786 A1 Sep. 20, 2018

(51) Int. Cl.
H04W 68/02 (2009.01)
H04W 8/02 (2009.01)
H04W 12/02 (2009.01)

(52) U.S. Cl.
CPC ............ *H04W 68/02* (2013.01); *H04W 8/02* (2013.01); *H04W 12/02* (2013.01)

(58) Field of Classification Search
CPC ........ H04W 68/02; H04W 8/02; H04W 12/02
USPC ....................................................... 455/458
See application file for complete search history.

(56) References Cited

U.S. PATENT DOCUMENTS

| | | | |
|---|---|---|---|
| 9,814,010 B1* | 11/2017 | Chastain | H04W 4/70 |
| 2015/0230200 A1* | 8/2015 | Better | H04W 68/08 455/458 |
| 2016/0066296 A1* | 3/2016 | Su | H04W 68/005 455/458 |
| 2016/0100339 A1* | 4/2016 | Aghili | H04W 36/0022 370/331 |
| 2016/0100380 A1* | 4/2016 | Jha | H04W 68/005 455/458 |

FOREIGN PATENT DOCUMENTS

EP 2161963 A1 3/2010
WO PCT/US2018/021003 6/2018

OTHER PUBLICATIONS

3GPP, "3rd Generation Partnership Project; Technical Specification Group Services and System Aspects; Study on the Security Aspects of the Next Generation System (Release 14)," 3GPP TR 33.899 Technical Report, V0.7.0, Feb. 2017, 471 pages.

(Continued)

*Primary Examiner* — Timothy Pham
(74) *Attorney, Agent, or Firm* — Ryan, Mason & Lewis, LLP

(57) ABSTRACT

Techniques are provided for protecting the privacy of user equipment during paging operations in a communication system. In one example, a method includes determining at a mobility management element of a communication system that a paging operation is to be initiated for given user equipment. The method further includes restricting the paging operation between the mobility management element and the given user equipment to use of a temporary identifier for the given user equipment. By not using a permanent identifier of the given user equipment during paging operations, the given user equipment is effectively non-trackable by malicious base stations and active/passive listeners.

26 Claims, 5 Drawing Sheets

(56) References Cited

OTHER PUBLICATIONS

3GPP, "3rd Generation Partnership Project; Technical Specification Group Core Network and Terminals; Non-Access Stratus (NAS) Protocol for Evolved Packet System (EPS); Stage 3 (Release 14)," 3GPP TR 24.301 Technical Report, V14.2.0, Dec. 2016, 470 pages.
3GPP, "3rd Generation Partnership Project; Technical Specification Group Services and System Aspects; Study on the Security Aspects of the Next Generation System (Release 14)," 3GPP TR 33.899, V1.3.0, Aug. 2017, 605 pages.
3GPP, "New KI-Security Aspects of Avoiding IMSI Paging in 5G (Release 14)," 3GPP TSG-SA WG3 Meeting#86bis, 5.1.4, S3-170662, Mar. 2017, 2 pages.
3GPP, "3rd Generation Partnership Project; Technical Specification Group Core Network and Terminals; Non-Access-Stratum (NAS) Protocol for Evolved Packet System (EPS); Stage 3 (Release 14)," 3GPP TS 24.301, V14.2.0, Dec. 2016, 482 pages.

\* cited by examiner

PROTECTION OF PRIVACY IN PAGING OF USER EQUIPMENT

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services. Such eMBB services are intended to provide improved wireless Internet access for mobile devices.

In an example communication system, user equipment (UE) such as a mobile device communicates over an air interface with a base station referred to as an evolved Node B (eNB). The eNB is illustratively part of an access network of the system such as, for example, an Evolved Universal Terrestrial Radio Access Network (E-UTRAN). The eNB provides access for the UE to a core network (CN), which then provides access for the UE to a data network such as a packet data network (e.g., Internet).

During the course of operation, it is sometimes necessary for the CN to seek, also known as "page," the UE when the UE is in an idle mode. However, using current legacy paging techniques, "fake" eNBs (e.g., eNBs set up and maintained by malicious operators to appear to be legitimate eNBs) or any active/passive listener can track down the physical presence of a user with reasonable accuracy to a specific and limited geographic area. This fake eNB or active/passive listener threat has serious security implications for users and is not addressed in 4G/LTE or other legacy services.

SUMMARY

Illustrative embodiments provide techniques for protecting the privacy of user equipment during paging operations in a communication system.

In one embodiment, a method comprises determining at a mobility management element of a communication system that a paging operation is to be initiated for given user equipment. The method further comprises restricting the paging operation between the mobility management element and the given user equipment to use of a temporary identifier for the given user equipment.

Advantageously, in an illustrative embodiment, a core network of a communication system determines that given user equipment has data available for download. The given user equipment is paged from the core network exclusively using a temporary identifier for the given user equipment to avoid any listener of paging messages or a malicious base station from determining a permanent identifier of the given user equipment. By exclusively, it is meant that the permanent identifier is not used for any paging operations between the core network and the given user equipment. By not using the permanent identifier of the given user equipment during paging operations, the given user equipment is effectively non-trackable by the malicious base station and active/passive listeners. While these techniques can be applied to various communication networks, they are particularly suitable for 5G and next generation communication networks.

Further embodiments are provided in the form of non-transitory computer-readable storage medium having embodied therein executable program code that when executed by a processor causes the processor to perform the above steps. Still further embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for paging user equipment in a manner which avoids using a permanent identifier for the user equipment. It should be understood, however, that the scope of the claims is not limited to particular types of communication systems and/or paging processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC), the disclosed embodiments can be adapted in a straightforward manner to a variety of other types of communication systems including, but not limited to, WiMAX systems and Wi-Fi systems.

Figure 1:
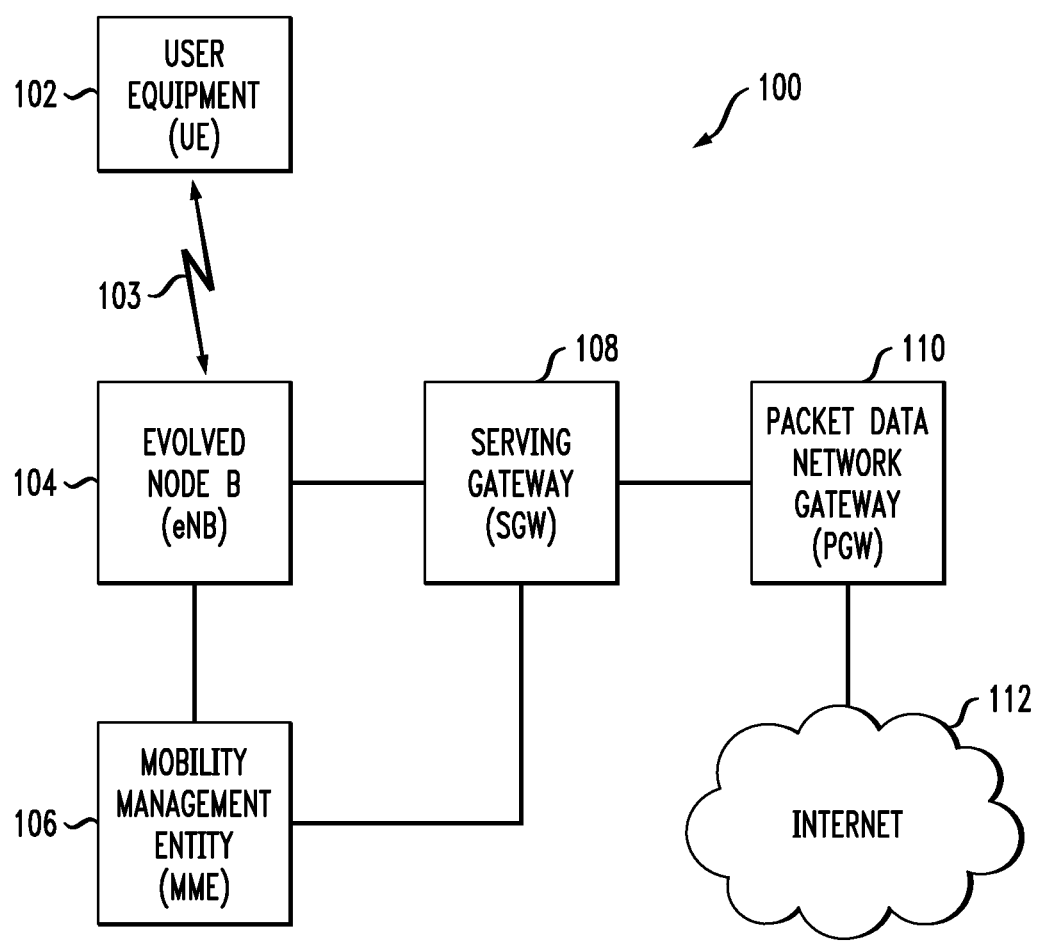
FIG. 1 is a block diagram of a communication system in an illustrative embodiment.

FIG. 1 shows a communication system 100 comprising user equipment (UE) 102 that communicates via an air interface 103 with an evolved Node B (eNB) 104. In this illustrative embodiment, the communication system 100 comprises a wireless cellular system, and more particularly, an LTE system.

The user equipment 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop. Such communication devices are also intended to encompass devices commonly referred to as access terminals.

The eNB 104 is illustratively part of an access network of the communication system 100. Such an access network may comprise, for example, an E-UTRAN having a plurality of base stations and one or more associated radio network controllers (RNCs). The base stations and RNCs are logically separate entities, but in a given embodiment may be implemented in the same physical network element, such as, for example, a base station router or femto cellular access point.

The eNB 104 in this illustrative embodiment is operatively coupled to a Mobility Management Entity (MME) 106. MME 106 is one example of what is referred to as a "mobility management element" or "mobility management function." A mobility management element or function, as used herein, is the element or function in the communication system that provides, among other network operations, paging operations with the UE (through the eNB). The eNB 104 is also operatively coupled to a Serving Gateway (SGW) 108, which is operatively coupled to a Packet Data Network (PDN) Gateway (PGW) 110. PGW 110 is operatively coupled to a Packet Data Network, e.g., Internet 112. MME 106 is also operatively coupled to SGW 108. MME 106 and SGW 108 are considered part of a core network (CN). In some embodiments, PGW 110 is also considered part of the CN.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1 arrangement is just one example configuration of a wireless cellular system, and numerous alternative configurations of system elements may be used. For example, although only single UE, eNB, MME, SGW and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of function sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 accesses one or more of these services through the CN via eNB 104.

As mentioned above, it is sometimes necessary for the CN (e.g., MME 106) to page the UE 102 when the UE 102 is in an idle mode for some reason. In one example, the UE 102 may be in idle mode when it is does not currently have a radio resource control (RRC) connection with the eNB 104. Paging is, in effect, a way of "waking up" the UE 102 in order for data to be transferred (downloaded) to the UE 102. However, as further mentioned above, current paging techniques allow fake eNBs or any listener of paging messages to track the physical presence of a user with reasonable accuracy to a specific and limited geographic area. This existence of the threat is realized in the 5G Technical Report (TR) 33.899, V0.7.0, entitled "3rd Generation Partnership Project; Technical Specification Group Services and System Aspects; Study on the security aspects of the next generation system," the disclosure of which is incorporated by reference herein in its entirety. However, no solution is given in TR 33.899 to mitigate or eliminate either the fake eNB or active/passive listener threat.

Active listening and passive listening attacks in legacy networks are explained as follows. Active listening involves the attacker initiating an action, such as calling the user over his/her phone, then observing the page messages to find out his/her IMSI. Passive listening correlates the user's presence with captured IMSIs paged in his/her presence. Thus, with the passive listening attack, there is no action initiated by the attacker other than capturing logs of visible IMSIs.

Various embodiments overcome the threat and other drawbacks associated with existing paging processes by realizing that the fake eNB or active/passive listener threat is enabled by the use of a permanent identifier for the UE, and thus avoiding use of this permanent identifier when sending paging messages to the UE. An example of such a permanent identifier for a UE is an International Mobile Subscriber Identity (IMSI), although alternative permanent identifiers for a UE may exist. Illustrative embodiments describe the paging process from the perspective of the UE 102 and the MME 106 (operatively coupled via the eNB 104). However, in alternative network configurations, other elements may be involved in the paging process.

Figure 2:
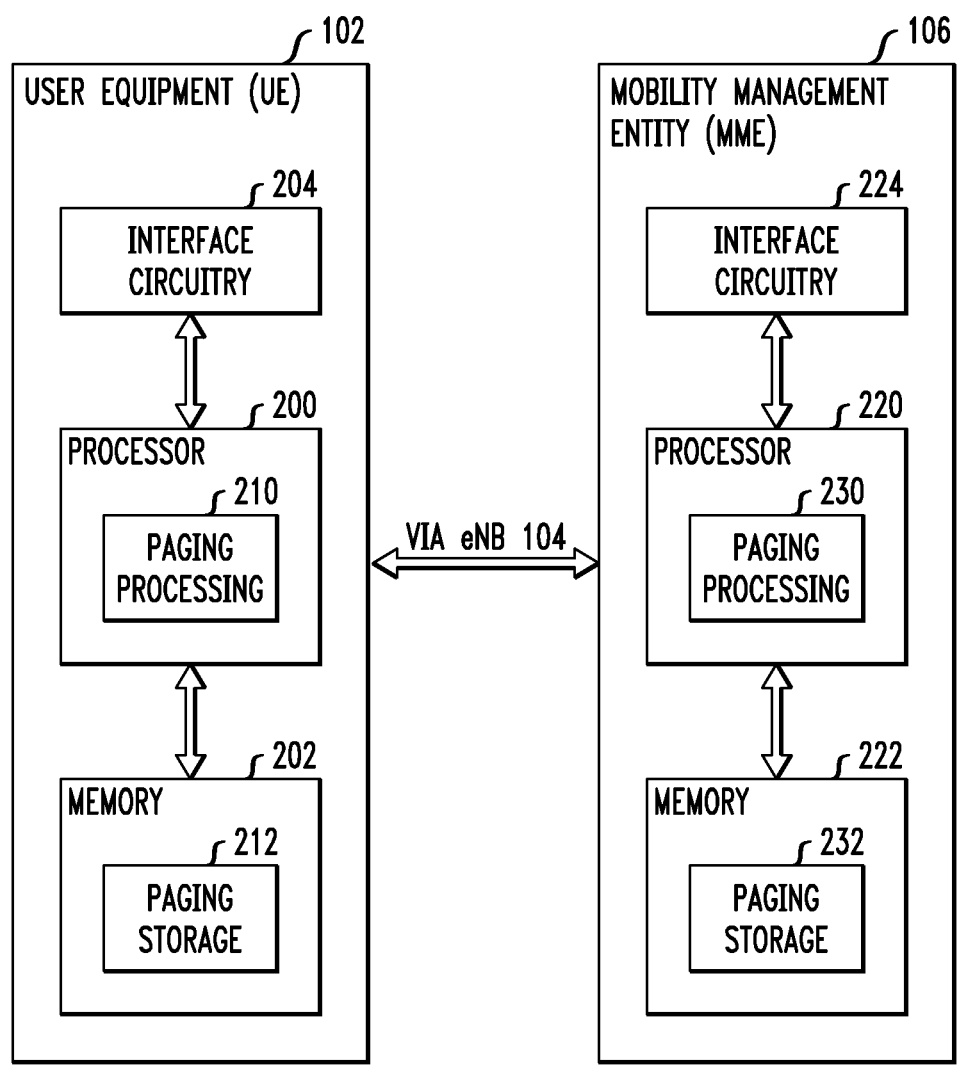
FIG. 2 shows a more detailed view of example user equipment and mobility management entity elements in an illustrative embodiment.

FIG. 2 shows a more detailed view of UE 102 and MME 106 in an illustrative embodiment. The UE 102 comprises a processor 200 coupled to a memory 202 and interface circuitry 204. The processor 200 of the UE 102 includes a paging processing module 210 that may be implemented at least in part in the form of software executed by the processor. The paging processing module 210 performs the user equipment operations of the processes described in conjunction with subsequent figures and otherwise herein. The memory 202 of the UE 102 includes a paging storage module 212 that stores data generated during paging operations with the MME 106 through the eNB 104.

The MME 106 comprises a processor 220 coupled to a memory 222 and interface circuitry 224. The processor 220 of the MME 106 includes a paging processing module 230 that may be implemented at least in part in the form of software executed by the processor. The paging processing module 230 performs the MME operations of the processes described in conjunction with subsequent figures and otherwise herein. The memory 222 of the MME 106 includes a paging storage module 232 that stores data generated during paging operations with the UE 102 through the eNB 104.

The processors 200 and 220 of the respective UE 102 and MME 106 may comprise, for example, microprocessors, application-specific integrated circuits (ASICs), digital signal processors (DSPs) or other types of processing devices, as well as portions or combinations of such elements.

The memories 202 and 222 of the respective UE 102 and MME 106 may be used to store one or more software programs that are executed by the respective processors 200 and 220 to implement at least a portion of the functionality described herein. For example, paging operations and other functionality as described in conjunction with subsequent figures and otherwise herein may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective UE 102 and MME 106 illustratively comprise transceivers or other communication hardware or firmware that allows the associated system elements to communicate with one another in the manner described herein.

It is apparent from FIG. 2 that UE 102 is configured for communication with MME 106 and vice-versa via their respective interface circuitries 204 and 224. The UE 102 communicates with the MME 106 via eNB 104. This communication involves UE 102 sending data to the MME 106 via eNB 104 and the MME 106 sending data to the UE 102 via eNB 104. However, in alternative embodiments, other network elements may be operatively coupled between the UE and MME. The term "data" as used herein is intended to be construed broadly, so as to encompass any type of information that may be sent between user equipment and a core network via a base station element including, but not limited to, paging data, control data, audio, video, multimedia, etc.

It is to be appreciated that the particular arrangement of components shown in FIG. 2 is an example only, and numerous alternative configurations may be used in other embodiments. For example, the user equipment and mobility management entity can be configured to incorporate additional or alternative components and to support other communication protocols.

Other system elements, such as eNB 104, SGW 108, and PGW 110, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB and an associated RNC.

In the current 4G/LTE (legacy) networks, while sending paging messages to the UEs in idle mode to alert them about incoming data, two kinds of identities have been used:

1) Temporary Non-Access Stratum (NAS) identifier referred to as the S-TMSI (SAE-Temporary Mobile Subscriber Identity, where SAE refers to System Architecture Evolution) identifier, which is part of the Global Unique Temporary UE Identity (GUTI); and 2) Permanent International Mobile Subscriber Identity referred to as the IMSI identifier.

3GPP Specification TS 24.301, V14.2.0, entitled "3rd Generation Partnership Project; Technical Specification Group Core Network and Terminals; Non-Access-Stratum (NAS) protocol for Evolved Packet System (EPS)," the disclosure of which is incorporated by reference herein in its entirety, describes different paging procedures (e.g., see, more particularly, clause 5.6.2).

Figure 3:
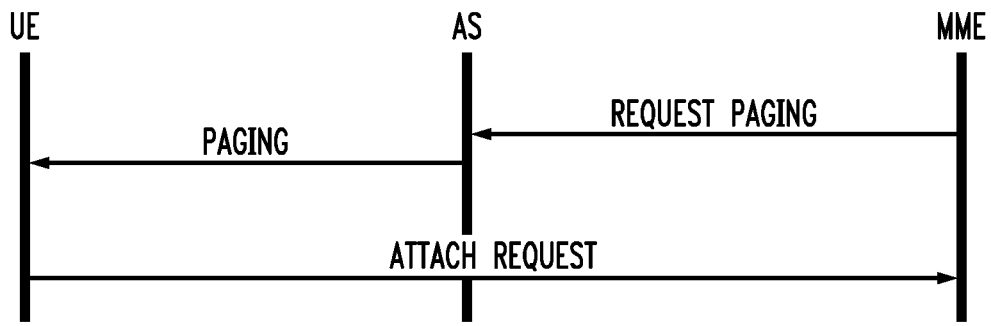
FIG. 3 shows a message flow for a part of a paging process using a permanent identifier for user equipment.
Figure 4:
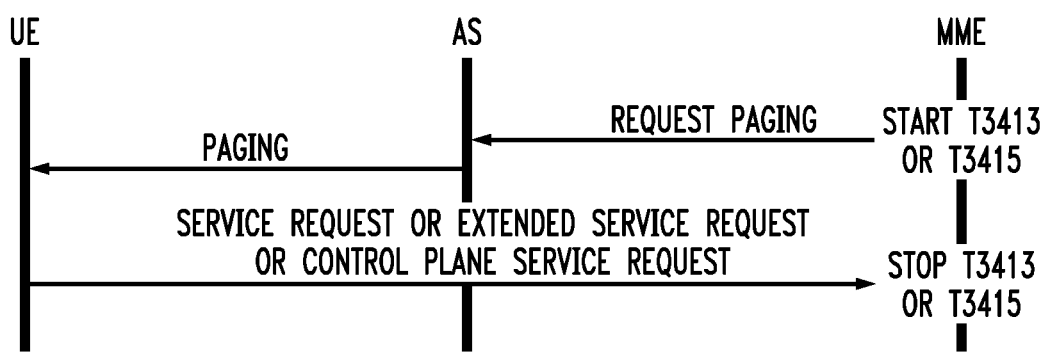
FIG. 4 shows a message flow for a part of a paging process using of a temporary identifier for user equipment.

FIG. 3 shows a message flow for a part of a paging process using IMSI for user equipment according to TS 24.301. FIG. 4 shows a message flow for a part of a paging process using of S-TMSI for user equipment according to TS 24.301. AS refers here to Access Stratum. Thus, 4G/LTE systems use both IMSI and S-TMSI for paging message between the MME and UE depending on the circumstances, as explained below.

The network in the 4G/LTE network normally uses the temporary identifier S-TMSI to send paging messages. However, the permanent subscription identifier IMSI is used as the UE identifier in situations where the CN (e.g., MME) loses its UE context (e.g., IMSI, S-TMSI, etc.) due a reset or crash and requires a fresh start. IMSI paging is also used in situations where the UE has been assigned a new temporary identifier GUTI (which S-TMSI is part of), but the acknowledgement from the UE does not reach the CN (e.g., MME) for some reason (i.e., UE is non-communicative from the perspective of the MME). In this case, to make sure the UE has the correct S-TMSI/GUTI, the network pages the UE using the permanent identifier IMSI.

Though the use of IMSI paging has been carried on through legacy networks (e.g., 2G, 3G, and 4G networks), illustrative embodiments provide techniques that avoid the use of IMSI as the paging identifier in a communication network. Embodiments realize that MME systems can be configured to maintain UE contexts such that they are reliable and do not undergo reset or crash. MME implementations according to embodiments are configured to have redundancy (secondary storage or cache) built in, and even if one part goes down, the UE contexts are preserved.

Furthermore, when a 4G MME initiates a 'Create Session Request,' it sends parameters {e.g., IMSI, EPS bearer identifier, etc.} to the SGW. IMSI is also used as the identifier for 'Create Session Request' in S4/S11, S2a/S2b. Because the UE identifier is the IMSI, when there is incoming data, the SGW uses the IMSI as the identifier for the paging request to the MME. If another identifier S-TMSI is used, this could as well be the identifier to initiate paging. Thus, in accordance with illustrative embodiments, there is no necessity for the IMSI as the UE identifier in the paging request. If for billing/CDR (call detail record) reasons the IMSI is needed at the SGW, it can be used within the core network, but for other purposes, and in particular the air interface, S-TMSI can serve the purpose.

In an 5G network, if the temporary identifier S-TMSI is used over the NAS N11 between the Access and Mobility Management Function (AMF at the MME 106) and the Session Management Function (SMF at the SGW 108), whenever the S-TMSI is reallocated, the SMF has to be kept in synchronization with the AMF. But for this purpose, reallocation of S-TMSI and IMSI as paging identifiers need not be linked. The AMF can cache the IMSI and the most current S-TMSI allocated to it and use the S-TMSI for paging, if it receives a request to initiate paging. In this manner, according to illustrative embodiments, IMSI paging does not become necessary and user tracking by employing active/passive listening techniques or by fake eNBs using IMSI paging can be avoided. Hence, the only (exclusive) paging identifier used in accordance with illustrative embodiments becomes the S-TMSI.

By eliminating paging using the UE permanent identifier, the user's privacy is protected since the UE becomes non-trackable using this method. Note that this is under the assumption that temporary identifiers are changing as well (e.g., by operator policy) or enforced by the UE.

From a processing point of view, it is advantageous for the UE to scan and process only S-TMSI paging messages resulting in less computation of paging frames and paging occasions, compared to processing both types of paging messages using two identifiers (IMSI and S-TMSI) as it is done in legacy practice.

Figure 5:
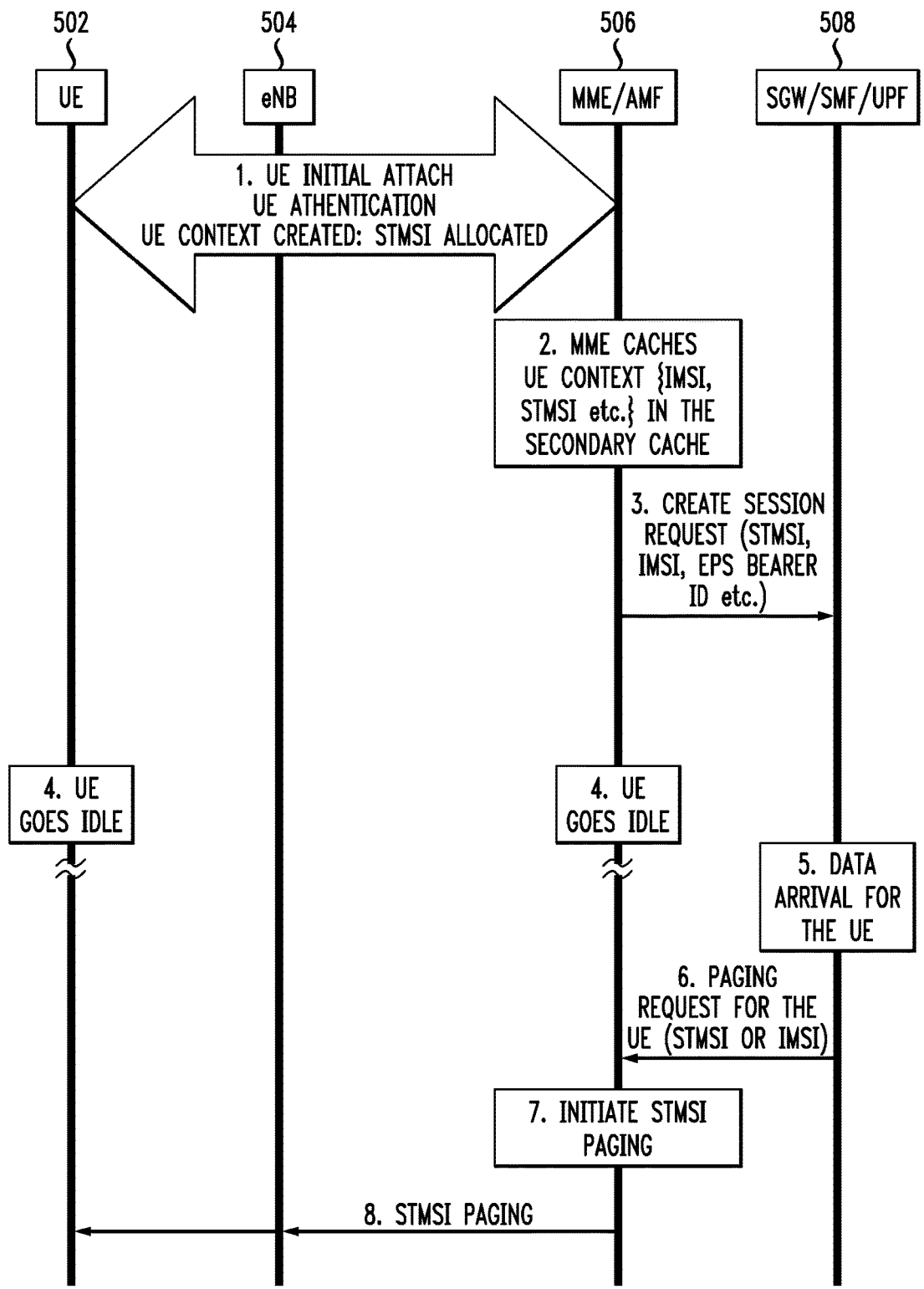
FIG. 5 shows a message flow for a paging process avoiding use of a permanent identifier for user equipment in an illustrative embodiment.

An illustrative embodiment is described in FIG. 5. More particularly, FIG. 5 shows a message flow for a paging process avoiding use of a permanent identifier for user equipment. It is to be appreciated that the system elements shown in FIG. 5 (UE, eNB, MME, SGW) correspond to similarly labeled system elements in FIGS. 1 and 2. The numbered steps below correspond to the numbers of the message flow in FIG. 5.

1. UE 502 performs an Initial Attach with the network (MME 506). The MME 506 and the UE 502 authenticate each other. A UE context is established in the MME 506 for the UE 502. A temporary network identifier GUTI which contains S-TMSI is also established in the UE 502 and MME 506. In the 5G network, the role of the MME is performed by the AMF.

2. MME/AMF 506 caches the UE context (permanent UE identifier IMSI, temporary identifier S-TMSI, etc.) in secondary storage (cache), so that in case of system faults or crashes, the MME 506 is able to retrieve the identifiers. It is to be appreciated that the cache can be part of memory 222 (FIG. 2), paging storage 232 (FIG. 2), and/or some other secondary storage accessible by the MME/AMF.

3. MME/AMF 506 requests SGW (with SMF and User Plane Function or UPF) 508 to create a session for the UE 502 by sending Create Session Request (e.g., IMSI, S-TMSI, Bearer identifier, etc.) for starting a data session for the UE 502.

4. UE 502 goes into idle mode once the data session is completed.

5. After some time period, SGW/UPF/SMF 508 gets incoming data meant for the UE 502 (e.g., from a PDN such as 112 in FIG. 1). Since the UE is in idle mode, MME/AMF 506 needs to be alerted to send a paging message to the UE 502 to instruct the UE 502 to reconnect to the network.

6. SGW/UPF/SMF 508 sends an incoming data alert message to MME/AMF 506. S-TMSI is the UE identifier used in the message. In an alternative embodiment, IMSI of the UE can also be added to the message from the SGW/SMF/UPF 508 to the MME/AMF 506.

7. MME/AMF 506 decides to initiate paging for the UE 502. MME/AMF 506 initiates S-TMSI paging only. If for any reason the requested temporary identifier S-TMSI is missing, the MME/AMF 506 retrieves the S-TMSI from the secondary storage (cached in step 2), by looking at the IMSI or S-TMSI from the received message from SGW/UPF/SMF 508. Thus, no IMSI paging is performed.

8. MME/AMF 506 starts sending the S-TMSI paging message to the eNB 504, and the eNB 504 broadcasts these messages over the air link (e.g., 103 in FIG. 1). Thus, advantageously, over the air link, the UE identifier in the message is only S-TMSI, thus protecting the UE from fake eNBs or any active/passive listener tracking its geographic location.

In another embodiment, the UE may alternatively indicate to the core network/MME that it always prefers S-TMSI paging and will not listen to IMSI paging since it is sensitive to its privacy. This information can be part of the UEs context (e.g., established in step 1 in FIG. 5) in the MME, and while selecting the paging process, the MME knows that the UE will not listen to IMSI paging at all. Such UEs will listen to only S-TMSI paging and if, at any time, they lose the temporary S-TMSI identifier due to any unforeseen circumstances, the UE will make a fresh network attach as part of a recovery process.

Figure 6:
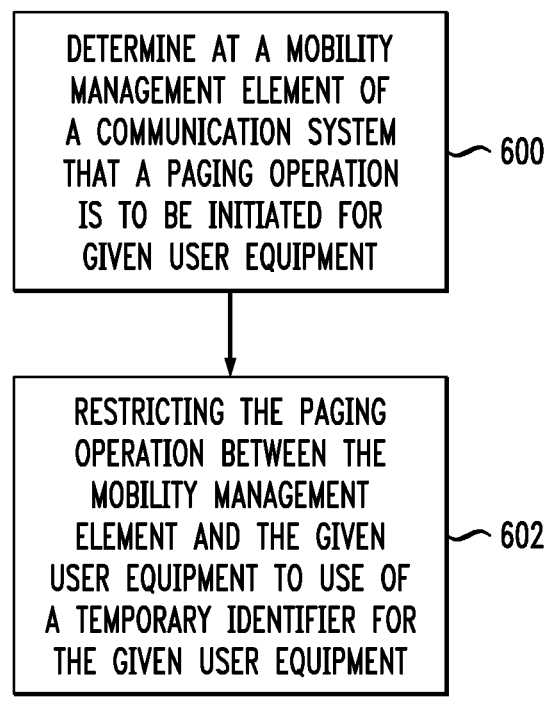
FIG. 6 shows a flow diagram of a paging process avoiding use of a permanent identifier for user equipment in an illustrative embodiment.

FIG. 6 shows a flow diagram of a paging process avoiding use of a permanent identifier for user equipment in an illustrative embodiment.

In step 600, a mobility management element (e.g., MME 506) determines that a paging operation is to be initiated for given user equipment.

In step 602, the paging operation between the mobility management element and the given user equipment is restricted to use of a temporary identifier for the given user equipment.

In illustrative embodiments, the "paging operation" comprises the MME sending one or more paging messages (e.g., paging alerts) to the given user equipment (e.g., UE 502). One or more of the paging messages have inserted therein or otherwise appended thereto or associated therewith, an identifier of the given user equipment so that the given user equipment knows that the message is intended for it. In accordance with illustrative embodiments, the identifier is exclusively a temporary identifier for the given user equipment and not a permanent identifier for the given user equipment.

Advantageously, embodiments provide for exclusively using temporary network identifier of a UE while sending paging alerts to UEs while they are in idle mode. As such, use of the permanent subscription identifier for paging alerts is avoided.

Furthermore, in accordance with embodiments, the MME may allocate a GUTI to a UE in order to support the subscriber identity confidentiality. S-TMSI, the shortened form of the GUTI, is used to support the subscriber identity confidentiality with more efficient radio signalling procedures (e.g., paging and service request). A new GUTI is sent to the UE only after a successful activation of NAS security. In environments with strong privacy requirements, the MME ensures the correct reception and activation of a new GUTI by the UE by verifying its acknowledgement. If the acknowledgement is not received initially, the MME pages the UE using the old S-TMSI and new S-TMSI and ensures the reception. Again, advantageously, use of the permanent subscription identifier (IMSI) of the UE for paging alerts is avoided. The UE does not listen to any IMSI paging nor respond to any IMSI paging by the network, if it has an S-TMSI assigned by the network.

It is to be appreciated that the naming of identifiers mentioned herein, e.g., IMSI, S-TMSI, GUTI, etc., are for illustrative purposes only. That is, a temporary identifier and/or a permanent identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the LTE context and the disclosed techniques can be adapted in a straightforward manner to a wide variety of other communication system contexts including, but not limited to, other 3GPP systems and non-3GPP systems which employ a permanent identity (e.g., IMSI or equivalent) in the paging process.

The processor, memory, controller and other components of a user equipment or base station element of a communication system as disclosed herein may include well-known circuitry suitably modified to implement at least a portion of the paging functionality described above.

As mentioned above, embodiments may be implemented in the form of articles of manufacture each comprising one or more software programs that are executed by processing circuitry of user equipment, base stations or other elements of a communication system. Conventional aspects of such circuitry are well known to those skilled in the art and therefore will not be described in detail herein.

Also, embodiments may be implemented in one or more ASICS, FPGAs or other types of integrated circuit devices, in any combination. Such integrated circuit devices, as well as portions or combinations thereof, are examples of "circuitry" as that term is used herein.

A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, paging processes, messaging protocols and message formats than those described above in the context of the illustrative embodiments. These and numerous other alternative embodiments within the scope of the appended claims will be readily apparent to those skilled in the art.

What is claimed is:

1. A method comprising:
   determining at a mobility management element of a communication system that a paging operation is to be initiated for given user equipment;
   receiving, at the mobility management element from a core network of the communication system, a first paging request comprising a permanent identifier for the given user equipment;
   restricting the paging operation between the mobility management element and the given user equipment to use of a temporary identifier for the given user equipment by:
      utilizing the permanent identifier in the first paging request to retrieve the temporary identifier for the given user equipment from a cache of the mobility management element;
      generating a second paging request comprising the retrieved temporary identifier for the given user equipment; and
      sending the second paging request to a base station element of the communication network to initiate the paging operation utilizing the temporary identifier for the given user equipment;
   wherein the mobility management element comprises a processor and memory configured to execute the above steps.

2. The method of claim 1, wherein the paging operation restricting step further comprises:
   determining at the mobility management element existence of one or more conditions associated with the given user equipment; and
   in response to the existence of the one or more conditions, paging the given user equipment using the temporary identifier for the given user equipment.

3. The method of claim 2, wherein the one or more conditions associated with the given user equipment comprise the given user equipment being non-communicative from the perspective of the mobility management element.

4. The method of claim 2, wherein the one or more conditions associated with the given user equipment comprise the mobility management element no longer having a security context for the given user equipment.

5. The method of claim 2, wherein the one or more conditions associated with the given user equipment comprise the given user equipment providing an indication to the mobility management element that the given user equipment will not listen for a paging message that uses a permanent identifier for the given user equipment.

6. The method of claim 1, further comprising the mobility management element storing the temporary identifier for the given user equipment in the cache in association with the permanent identifier for the given user equipment.

7. The method of claim 6, wherein the temporary identifier for the given user equipment is a Temporary Mobile Subscriber Identity (TMSI) or equivalent.

8. The method of claim 6, wherein the permanent identifier for the given user equipment is an International Mobile Subscriber Identity (IMSI) or equivalent.

9. The method of claim 6, further comprising the mobility management element performing a search of the cache for the temporary identifier for the given user equipment when the security context for the given user equipment is no longer available.

10. The method of claim 1, wherein the determining step further comprises arrival of downlink packet data at a serving gateway element of the communication system.

11. The method of claim 10, wherein the mobility management element comprises an access and mobility management function.

12. The method of claim 10, wherein the serving gateway element comprises a session management function and a user plane function.

13. The method of claim 1, wherein communication between the mobility management element and the given user equipment is through the base station element of the communication system.

14. An article of manufacture comprising a non-transitory computer-readable storage medium having embodied therein executable program code that when executed by a processor causes the processor to perform the method of claim 1.

15. An apparatus comprising:
   a network element in a communication system configured to provide a mobility management function and further configured to:
      determine that a paging operation is to be initiated for given user equipment;

receive, from a core network of the communication system, a first paging request comprising a permanent identifier for the given user equipment; and restrict the paging operation between the mobility management function and the given user equipment to use of a temporary identifier for the given user equipment by:

utilizing the permanent identifier in the first paging request to retrieve the temporary identifier for the given user equipment from a cache of the network element;

generating a second paging request comprising the retrieved temporary identifier for the given user equipment; and sending the second paging request to a base station element of the communication network to initiate the paging operation utilizing the temporary identifier for the given user equipment;

wherein the network element comprises a processor and memory configured to execute the above operations.

16. The apparatus of claim 15, wherein the paging operation restriction further comprises:

determining the existence of one or more conditions associated with the given user equipment; and in response to the existence of the one or more conditions, paging the given user equipment using the temporary identifier for the given user equipment.

17. The apparatus of claim 16, wherein the one or more conditions associated with the given user equipment comprise the given user equipment being non-communicative from the perspective of the mobility management function.

18. The apparatus of claim 16, wherein the one or more conditions associated with the given user equipment comprise the mobility management function no longer having a security context for the given user equipment.

19. The apparatus of claim 16, wherein the one or more conditions associated with the given user equipment comprise the given user equipment providing an indication to the mobility management function that the given user equipment will not listen for a paging message that uses a permanent identifier for the given user equipment.

20. The apparatus of claim 15, wherein the mobility management function is further configured to store the temporary identifier for the given user equipment in the cache in association with the permanent identifier for the given user equipment.

21. The apparatus of claim 20, wherein the temporary identifier for the given user equipment is a Temporary Mobile Subscriber Identity (TMSI) or equivalent.

22. The apparatus of claim 20, wherein the permanent identifier for the given user equipment is an International Mobile Subscriber Identity (IMSI) or equivalent.

23. The apparatus of claim 20, wherein the network element is further configured to perform a search operation of the cache for the temporary identifier for the given user equipment when the security context for the given user equipment is no longer available.

24. The apparatus of claim 15, wherein the determining step further comprises arrival of downlink packet data at a serving gateway element of the communication system.

25. The apparatus of claim 15, wherein communication between the network element and the given user equipment is through the base station element of the communication system.

26. A method comprising:

determining at a mobility management element of a communication system that a paging operation is to be initiated for given user equipment; and restricting the paging operation between the mobility management element and the given user equipment to use of a temporary identifier for the given user equipment;

wherein the mobility management element comprises a processor and memory configured to execute the above steps;

wherein the paging operation restricting step further comprises:

determining at the mobility management element existence of one or more conditions associated with the given user equipment; and in response to the existence of the one or more conditions, paging the given user equipment using the temporary identifier for the given user equipment;

wherein the one or more conditions associated with the given user equipment comprise the given user equipment providing an indication to the mobility management element that the given user equipment will not listen for a paging message that uses a permanent identifier for the given user equipment; and further comprising:

the mobility management element storing the temporary identifier for the given user equipment in a cache in association with a permanent identifier for the given user equipment; and the mobility management element performing a search of the cache for the temporary identifier for the given user equipment when the security context for the given user equipment is no longer available.

* * * * *